(12) United States Patent
Blaukopf et al.

(10) Patent No.: US 7,886,304 B1
(45) Date of Patent: Feb. 8, 2011

(54) METHOD AND SYSTEM IMPLEMENTING EFFICIENT REMOTE PROCEDURE CALL AND EMULATION SYSTEM THEREFOR

(75) Inventors: Daniel Blaukopf, Raanana (IL); Uri Katz, Tel Aviv (IL); Moshe Sayag, Raanana (IL)

(73) Assignee: Oracle America, Inc., Redwood City, CA (US)

( * ) Notice: Subject to any disclaimer, the term of this patent is extended or adjusted under 35 U.S.C. 154(b) by 859 days.

(21) Appl. No.: 11/833,123

(22) Filed: Aug. 2, 2007

Related U.S. Application Data

(63) Continuation-in-part of application No. 11/744,044, filed on May 3, 2007, now Pat. No. 7,730,492.

(51) Int. Cl.
    *G06F 13/00* (2006.01)
(52) U.S. Cl. .................. 719/312; 719/313; 719/328; 718/1; 718/100; 703/23; 703/24
(58) Field of Classification Search ................ 719/312, 719/313, 328; 718/1, 100; 703/23, 24
See application file for complete search history.

(56) References Cited

U.S. PATENT DOCUMENTS 6,519,605 B1 * 2/2003 Gilgen et al. ............... 719/331
7,613,847 B2 * 11/2009 Kjos et al. ................... 710/22

* cited by examiner

*Primary Examiner*—Andy Ho
(74) *Attorney, Agent, or Firm*—Martine Penilla & Gencarella, LLP

(57) ABSTRACT

A method of implementing in a general purpose computer system, a remote procedure call between an application and a target application is described. The target application is one of a plurality of second applications. The first application generates a first message, the first message having a message body and a thread ID of the target application. The first application writes the first message to a shared memory. The target application to polls the shared memory, and reads the first message from the shared memory. The target application generates a second message, the second message having a message body and a thread ID of the target application. The target application writes the second message to the shared memory. The first application polls the shared memory and reads the second message from the shared memory. The first message may be sent in response to the second message, vice versa, or asynchronously.

10 Claims, 5 Drawing Sheets

METHOD AND SYSTEM IMPLEMENTING EFFICIENT REMOTE PROCEDURE CALL AND EMULATION SYSTEM THEREFOR

CLAIM OF PRIORITY

This application is a Continuation In Part (CIP) of U.S. patent application Ser. No. 11/744,044, filed on May 3, 2007 now U.S. Pat. No. 7,730,492 and entitled, "Running Two Different Java Virtual Machines In One Process," which is incorporated herein by reference in its entirety.

CROSS-REFERENCE TO RELATED ART

This Application is related to U.S. Pat. No. 7,080,387, entitled "System and Method for Mediating Communication Between Software Applications," which issued on Jul. 18, 2006 and is incorporated herein by reference.

BACKGROUND

A virtual machine is a software layer between an application and a platform that isolates the application from the platform on which it is running. A platform comprises computer hardware and the operating system that drives low level operations of the hardware such as memory and thread management. Operating systems are generally written and compiled to function only with a particular central processing unit (CPU). There are different types of virtual machines. One type of virtual machine allows a multi-platform software application to execute without being written and compiled for the specific platform on which it is running. Another type of virtual machines permits a program designed to operate on one platform to operate on a different platform by modeling the hardware operations in the software domain. In either case, software instructions of the application are converted into native instructions rather then being directly executed natively by the CPU. The conversion of software instructions into native instructions may be performed using an interpreter, a just-in-time (JIT) compiler, or a combination of an interpreter and JIT compiler.

In the realm of resource-constrained platforms, which includes battery operated devices such as wireless phones, pagers, personal digital assistants, camcorders, game devices, MP3 players, small retail payment terminals and smart cards, etc., virtual machines are commonly used to provide cross-platform operability to software applications. One example of such a virtual machine is the Java CVM, which is used to launch and execute Java applications written to the connected device configuration (CDC). A resource-constrained platform having a CVM installed can execute cross-platform Java code to impart desired functionality to the system. For example, a mobile phone having an implementation of CVM can run Java software to implement a game, a calendar, an alarm, or other desired function.

Computer systems implemented in mobile devices or other resource-constrained platforms are generally not well suited for software development. For example, it can be difficult if not impossible to connect a keyboard and full-size monitor to a resource-constrained platform such as a cell phone to write a software application, much less compile the application into byte code suitable for execution on the virtual machine. Because it is not practical to develop and debug software intended for execution on a resource-constrained platform on that same system, it would be desirable to configure a version of the CVM to operate on a desktop computer system. However, in this case, the input and output of the user-interface and other specialized hardware such as networking connectivity must be mapped from the resource-constrained platform to the desktop computer system. Since each resource-constrained platform type (e.g., a particular model of a mobile phone) is provided with a corresponding CVM that is specifically designed with hardware-specific application programming interfaces to operate a specific configuration, it is not practical to reconfigure each CVM with modified APIs that provide user-input and output mapped from the resources available in the resource-constrained platform to the desktop computer system.

Resource constrained platforms are known that are capable of executing a plurality of applications concurrently. There are various techniques for managing multiple applications in a single device. In one technique, an application management system starts, stops, and pauses multiple applications in cooperation with the applications themselves. The application can designate a single active application, which is an application that has control over the user interface, although multiple applications can be executing concurrently in the background. Previous emulation systems were inefficient in providing communication between an emulation program, which may be, for example, a Java SE application that translates user input and output into inputs and outputs available in a resource constrained device such as a mobile phone or PDA.

U.S. Pat. No. 7,080,387 issued on Jul. 18, 2006 ("the '387 patent") presents a mechanism for placing a Java application in communication with a native application in a different process. Using this mechanism, a function in the native application can be called from the Java application operating in a virtual machine. Thus, the mechanism described the '387 patent can be used to allow a CVM operating a Java ME application intended for execution on a resource-constrained platform to function on a desktop computer system by allowing a separate application emulator program to access input and output of the Java ME application. Once the application emulator has access to the inputs and outputs of the Java ME application, it can map those inputs and outputs as desired to the actual interface and devices connected to the desktop computer system.

Unfortunately, the local TCP/IP connection implemented by the mechanism described in the '387 patent represents a bottle-neck that restricts data flow between the two virtual machines, thereby reducing performance of the system as a whole.

SUMMARY

Broadly speaking, the present invention fills these needs by providing a method and system for running multiple virtual machines in a single process. It should be appreciated that the present invention can be implemented in numerous ways, including as a process, an apparatus, a system, a device, or a method. Several inventive embodiments of the present invention are described below.

In one embodiment, a method of implementing in a general purpose computer, a remote procedure call between a first application and a target application is provided. The target application is one of a plurality of second applications. The first application generates a first message, the first message having a message body and a thread ID of the target application. The first application writes the first message to a shared memory. The target application polls the shared memory, and reads the first message from the shared memory. The target application generates a second message, the second message having a message body and a thread ID of the target application. The target application writes the second message to the shared memory. The first application polls the shared memory and reads the second message from the shared memory. The first message may be sent in response to the second message, vice versa, or asynchronously.

In another embodiment, a method for emulating a resource constrained platform on a general purpose computer is provided. In the method, an application emulator generates and displays a graphical representation of a user interface of the resource constrained platform, the application emulator being a program executing on the general purpose computer. The application emulator receives user input generated by user interaction with a user interface of the general purpose computer, the user interaction indicating a virtual interaction with the resource constrained device. The user input is mapped to a mapped user input by the application emulator, the mapped user input comprising a representation of the virtual interaction with the resource constrained device. The application emulator generates a user input message having an active application identifier and information defining the mapped user input, the active application identifier identifying a selected one of a plurality of cross platform applications, each of the cross platform applications being suitable for execution on the resource constrained platform. The user input message is passed to one of a plurality of virtual machines, the one of the plurality of virtual machines having a thread identifier corresponding to the active application identifier and running the selected one of the plurality of cross platform applications. The passing of the message is performed by accessing a shared resource of the general purpose computer system. The information defining the mapped user input is received into the selected one of the plurality of cross platform applications, which interprets the information as actual user input of the resource constrained device.

In yet another embodiment, a method for emulating a resource constrained platform on a general purpose computer is provided. In this method one of a plurality of cross platform applications generates an output suitable for a user output device attached to the resource constrained platform. The user output is passed to an application programming interface of a virtual machine within which the cross platform application executes. The virtual machine generates a user output message, the user output message having information defining the user output and a thread identifier that uniquely identifies a process thread of the general purpose computer that is responsible for executing the virtual machine. The virtual machine passes the user output message to an application emulator, the passing being performed by accessing a shared resource of the general purpose computer system. The application emulator executes in a different process than the virtual machine and has a user selectable active application identifier. The application emulator receives the user output message and is caused to compare the active application identifier to the thread identifier. When the active application identifier corresponds to the thread identifier, the application emulator maps the user output defined by the information to a user output device connected to the general purpose computer system and presents the information to a user of the general purpose computer system. When the active application identifier does not correspond to the thread identifier, the application emulator stores the user output defined by the information in an output buffer.

The advantages of the present invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

In the following description, numerous specific details are set forth in order to provide a thorough understanding of the present invention. However, it will be apparent to one skilled in the art that the present invention may be practiced without some of these specific details. In other instances, well known process operations and implementation details have not been described in detail in order to avoid unnecessarily obscuring the invention, which is directed primarily to a communication mechanism enabling communication between a cross-platform application and a plurality of native-language programs, all executing concurrently.

U.S. patent application Ser. No. 11/744,044 is directed to a system enabling a cross-platform application (e.g., a Java SE application) and a native language program to communicate over a Java Native Interface. However, in the system described therein, the cross-platform application executes in a single process with the native language program. Therefore, this system may not be suitable to enable a cross-platform application to communicate with a plurality of concurrently executing native language programs, since each may require their own address space.

In one embodiment, the communication mechanism described herein provides a remote procedure call (RPC) capability to an emulation system, enabling an application emulator to communicate with a plurality of programs being emulated. However, it should be recognized that the RPC functionality and the communication mechanism itself may have applications beyond emulation software. An RPC function typically involves a first application sending a query message to a second application. The query message may include parameters that is acted on by the second application. In response the second application can return a simple acknowledgement of receipt of the query and/or a response message containing information requested by the first application. To implement the RPC, the first and second applications must agree to a message format and delivery medium, as well as addressing (endpoint designations). These specifics can be referred to as a protocol. Any protocol can be implemented using the communication mechanism described herein.

Figure 1:
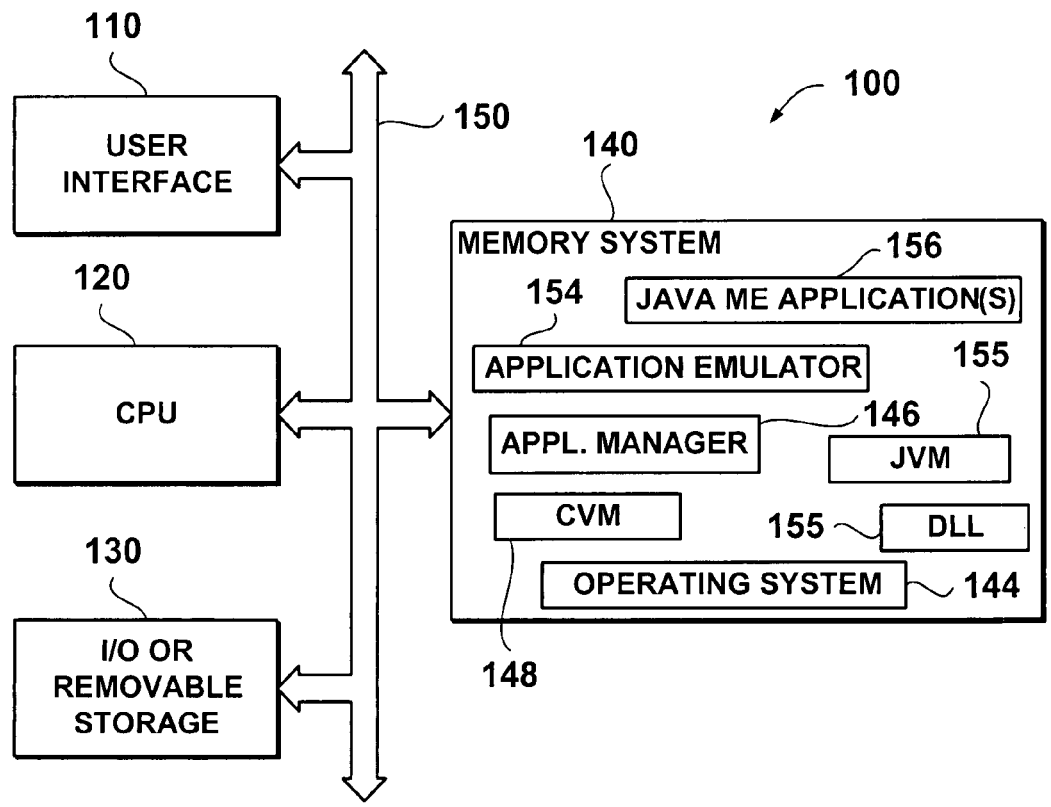
FIG. 1 is a schematic representation of a physical view of a computer system.

FIG. 1 is a schematic representation of a physical view of computer system 100. Computer system 100 includes a bus 150 connecting a user interface 110, a CPU 120, input/output (I/O) and/or removable storage 130, and memory system 140. User interface 110 may be any user interface suitable for application development. In one embodiment, user interface 110 includes user input devices such as keyboard and mouse inputs, and user output devices such as a video display and audio outputs. CPU 120 may include one or more processing cores for executing software. I/O and/or removable storage 130 may include removable data storage and/or communicating devices that allow memory system 140 to receive software and data from sources external to computer system 100.

Memory system 140 may include a plurality of memories for permanent and temporary storage of software applications and data. For example, memory system 140 may include a multi-tiered random-access memory system using virtual address spaces for each process that stores executing software and temporary data in a variety of locations including memory caches, active memory, and hard drive storage. In addition, memory system 140 may include non-volatile storage, e.g., using a hard drive storage device. Memory system 140 is therefore includes a computer-readable storage medium.

Memory system 140 can contain a variety of applications and operating system-specific software. In one embodiment, memory system 140 includes one or more Java ME applications 156, an application emulator 154, an application manager 146, a Java virtual machine (JVM) 155 a connected device configuration (CDC) virtual machine (CVM) 148, and an operation system 144. In one embodiment, the Java ME applications are written in conformance with the Java ME specification.

Figure 2:
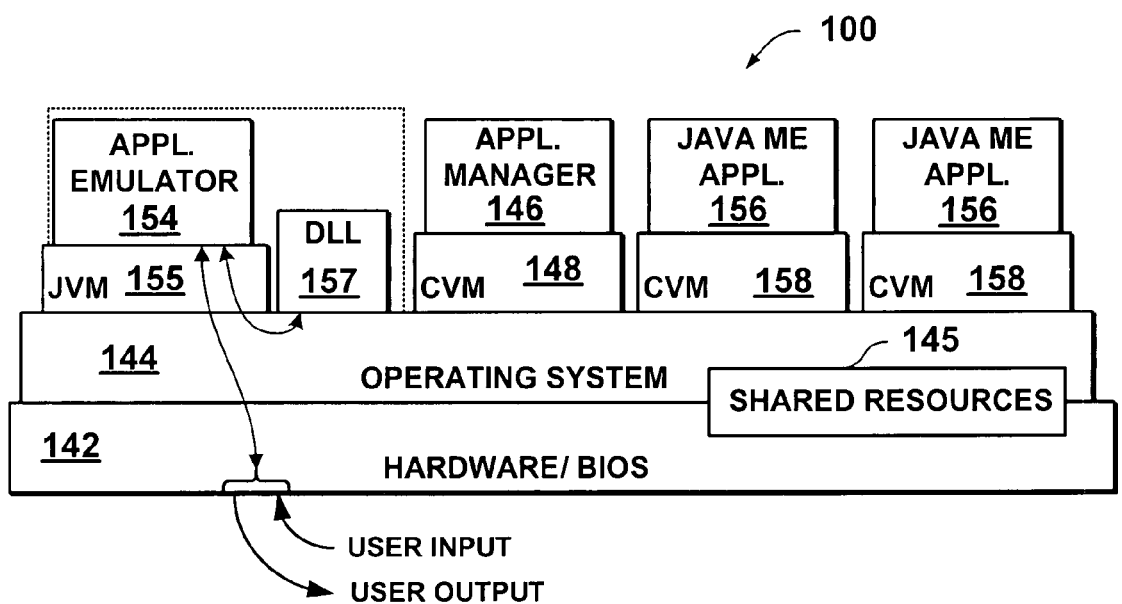
FIG. 2 shows a schematic representation of a logical view of the computer system of FIG. 1.

FIG. 2 shows a schematic representation of a logical view of computer system 100. Computer system 100 includes a hardware/BIOS layer 142 comprising processing and other circuitry as well as the lowest level software responsible for basic functions not handled by operating system 144, e.g., power on self test (POST), bootstrapping, and power and thermal management. Operating system 144 launches application software, manages CPU processes, memory resources, and input/output of the computer system, among other tasks. Any or each of the software components can be loaded from permanent storage, e.g., from a local hard drive, or over a network connection provided by I/O or removable storage 130.

Application manager 146 and other Java ME applications 156 are cross-platform applications that each execute in a corresponding connected device configuration (CDC) virtual machine (CVM) 148, 158. Although only two Java ME applications 156 and two CVMs 158 are shown, any number of Java ME applications, each executing in a corresponding CVM may be present. Each CVM is a native language program designed to execute on the platform defined by hardware 142 and operating system 144. In one embodiment, the CVMs 148, 158 are all identical, written in c or another standard programming language and compiled to native language machine code. The CVMs implement one or both of an interpreter or just in time (JIT) compiler to execute Java ME applications 156, as well as a plurality of application programming interfaces (APIs) for interacting with the external environment via operating system 144 and hardware 142.

Application manager 146 is, in one embodiment, a Java ME program that manages the lifecycles of other Java ME applications 156. For example, application manager 146 is capable of loading and launching a Java ME application 156 in a separate process on a different CVM 158. In addition, application manager 146 is responsible for pausing one application when it becomes inactive and resuming the application when it becomes active again. A paused application is an application that is executing but is in a "paused" state. In one embodiment, each Java ME application 156 is responsible for changing its state from paused to unpaused in response to messages received from application manager 146. For example, if a Java ME application 156 is a game that intended to execute on a mobile phone, application manager 146 may send a pause command to the Java ME application when an incoming call is received, thereby allowing the user to answer the call. Upon completion of the call, the application manager may give the user the option to resume or end the Java ME application. If the user selects resume, an unpause command is sent to the Java ME application. The Java ME application will continue to execute in the background regardless of the fact that it is in a paused state. For example, it may simply be awaiting a resume command, or it may perform some active processing, depending on its implementation.

Application emulator 154 is, in one embodiment, a Java SE program that executes in a Java virtual machine (JVM). Application emulator 154 is responsible for interacting directly with the user of general purpose computer 100. As such, it receives user input and generates user output via user interface 110 (FIG. 1). Application emulator 154 is also in communication with shared library or dynamic linked library (DLL) 157, which is a native language program. DLL 157 is a helper program that provides a method accessible to application emulator 154. In one embodiment, DLL 157 is launched by application emulator 154 and in communication with application emulator 154 by way of, e.g., a Java Native Interface (JNI) 152. In this embodiment, both JVM 152 and DLL 157 execute in a common process 151. As used herein, the terms, "shared library" and "DLL" are synonymous.

JNI provides a mechanism whereby native methods can be written in a standard programming language such as c and compiled to native code to handle those situations the standard Java class library does not support the platform-dependent features needed by the application. JNI therefore provides a mechanism to launch a native program such as a DLL which exposes a method to the Java application. Reference is made to the Java Native Interface Specification v. 1.1, which is incorporated herein by reference, for more information on JNI. Other virtual machines aside from Java provide similar functionality to JNI, and could also be used.

Each CVM 148, 158, and DLL 157 is in communication through shared resources 145. In one embodiment, shared resources 145 comprise a block or blocks of memory that is/are shared among one or more CVMs 148, 158 and DLL 157. The shared memory may be utilized in any of various ways. For example, each CVM may be assigned a distinct input and output space with corresponding locks to preventing simultaneous reads and writes.

Figure 3:
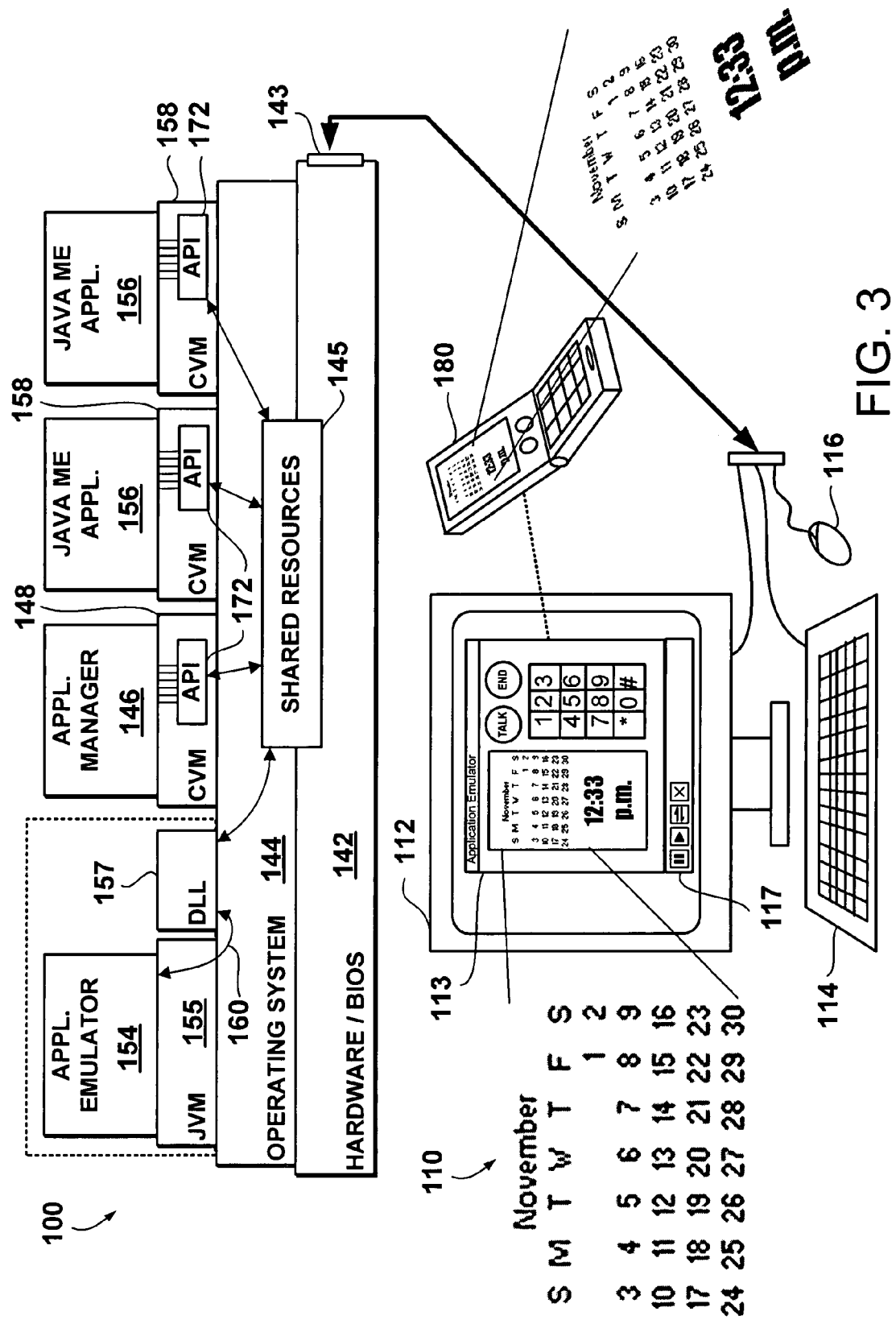
FIG. 3 shows the schematic representation of FIG. 2, with additional details to depict one example of how the computer system may be operated.

FIG. 3 shows additional details of an exemplary operation of computer system 100. Application emulator 154 accesses, via a communication mechanism described below, APIs 172 of CVMs 148, 158. APIs 172 direct input and output messages to and from each Java ME application to shared resources 145. These messages may include user output, user input, and interprocess communications, such as pause and kill commands sent by application manager 146 to one of the Java ME applications 156.

Application emulator 154, by way of DLL 157, receives user inputs and outputs and maps them to and from user interface 110 using APIs (not shown) of JVM 155, which in turn interface with operating system 144 and hardware/BIOS layer 142, ultimately communicating through ports 143 to interface devices, such as a display 112, keyboard, 114, and mouse 116 as shown. In one embodiment, application emulator 154 provides a graphical representation 113 of a resource constrained platform 180. Graphical representation 113 may include representations of an input device, e.g., a touch-screen and/or a keypad, and an output display of the physical resource-constrained platform 180. User interaction with the graphical representation 113, e.g., by the use of a mouse 116 or keyboard 114, when directed to a virtual interaction with the emulated device, is mapped to inputs of the corresponding resource constrained platform by application emulator 154 to messages which are sent by way of the Java Native Interface (JNI) 160 to APIs 172 in CVM 148. The API implementation then passes those messages through the APIs 172 to Java ME applications 156 which interpret the messages as user input in the same manner such program would receive actual input when executing within resource constrained device 180.

Display 112 may also include a toolbar 117 or other user interface element to enable a user to pause an active application, unpause an active application, switch the active application to a currently inactive application, or kill an application. Various other user interface elements, well known in the field of graphical user interfaces, such as a menu, may be provided to close the program, resize the window and graphical representation 113, etc.

Output generated by Java ME application(s) 156, such as a graphical image, is passed in the form of an output message to APIs 172 in CVM 148. Ultimately, application emulator 154 receives these messages and then maps that graphical image to a at least a portion of the display screen 112 viewable by the user, allowing the user to view what is being displayed by Java ME application 156. Other outputs, such as audio or networking outputs can be captured and conveyed to the user using a similar technique. In this way, the application emulator is able to access inputs and outputs of the Java ME application(s) and redirect the inputs and outputs thereof to local devices controlled by the application emulator.

Figure 4:
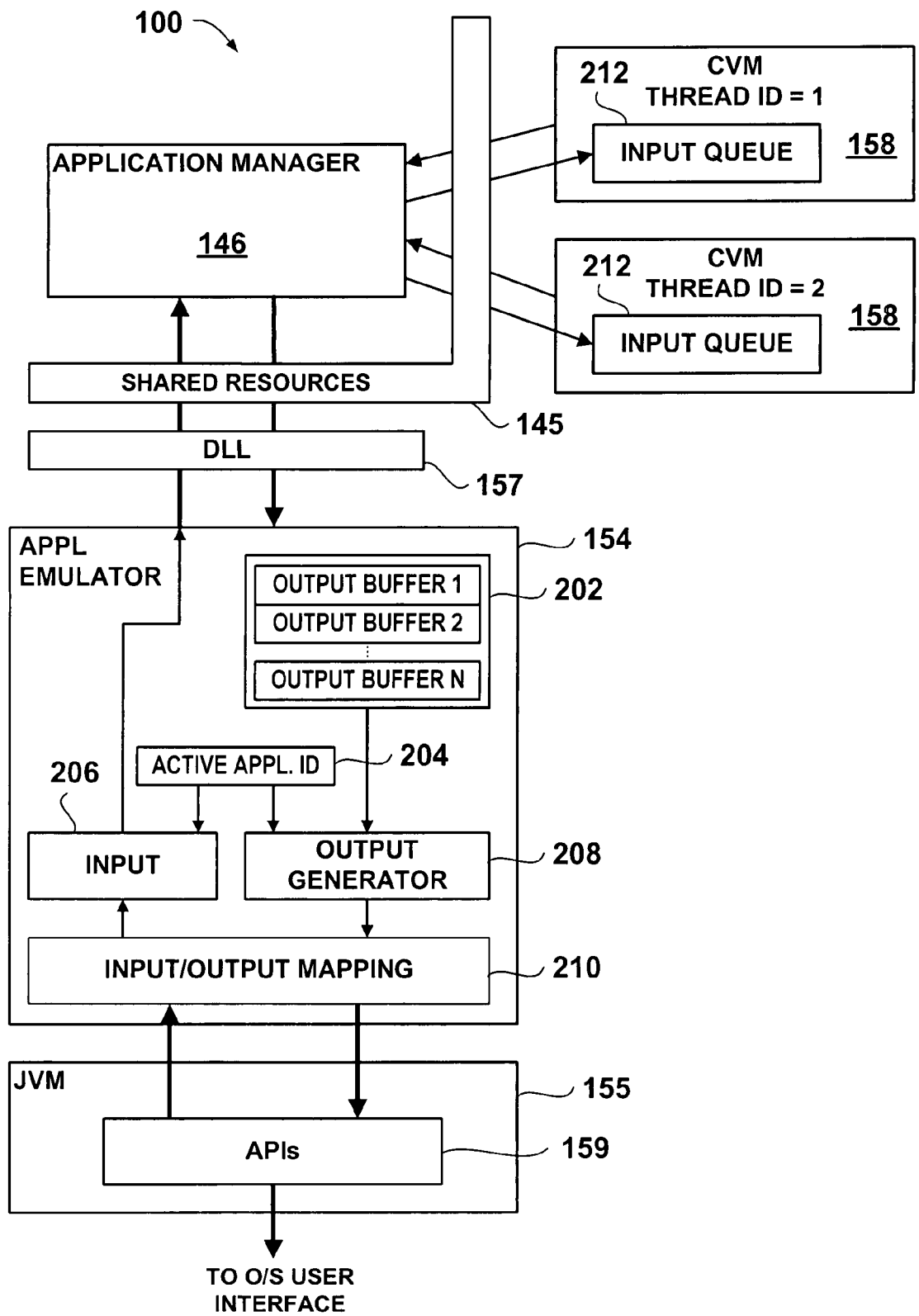
FIG. 4 shows a schematic representation of a portion of the system of FIGS. 1-3.

The mechanics of the communication mechanism will now be described with reference to FIG. 4, which shows a schematic representation of a portion of system 100. Application emulator 154 maintains an active application identifier (ID) 204 which identifies which of the Java ME applications are "active." By "active," it is meant which of the Java ME applications have control of the user input and outputs. For example, if a Java ME application provides a clock/calendar function to display a clock and calendar, then when that Java ME application is active, the clock and calendar display generated by the Java ME application will be displayed on the display screen portion of graphical representation 113 of the resource constrained device, e.g., as shown in FIG. 3. In one embodiment, the active application ID corresponds to a thread ID of the CVM that runs the active Java ME application. Those skilled in the art will recognize that, in any operating system, each process is uniquely identified by the operating system by one or more identification numbers. The thread ID is therefore one of the numbers utilized by operating system 144 (FIGS. 2, 3) to uniquely identify each of CVMs 148, 158.

Application emulator 154 manages user inputs and outputs by way of APIs 159 of JVM 155. When a user clicks or moves mouse 116, or presses a key on keyboard 114 (FIG. 3), application emulator 154 receives the input and determines whether the input is directed to a virtual interaction with one of Java ME applications 156, based on a location of a cursor or the specific input. If such input is directed to a Java ME application, then it is mapped by way of a mapping logic 210 to an input message recognizable by the Java ME application. This input message will be consistent with a message generated by an operating system of resource constrained device 180 modeled in software by system 100.

The input message is associated with active application ID 204, which may, for example, be attached to the input message, e.g., in a message header. Application emulator 154 then calls a method made available by DLL 157 with the message, or a pointer to the message, as a parameter to the method call. DLL 157 sends the message by way of shared resources 145 to application manager 146. For example, DLL 157 writes the message to a block of shared memory designated as input for application manager 146. Application manager then forwards the message to the appropriate CVM 158 based on the active application ID associated with the message. In one embodiment, each CVM 158 periodically polls shared resources 145 and reads any messages from shared resources into input queue 212 having an active application ID corresponding to the thread ID of the CVM. CVM 158 may then raise an event which is recognized by Java ME application 156 as a user input.

When Java ME program 156 generates an output, e.g., an image to be displayed on a display screen, it calls a method provided by APIs 172 (FIG. 3) of CVM 158 and passes the image to CVM 158 by way of the method. CVM 158 then associates the message with its thread ID, e.g., embeds the thread ID into a message header, and writes the message to shared resources 145. Application manager 146 receives the message, recognizes it as user output, and forwards the message to DLL 157. DLL 157 then maintains the information in an input queue (not shown) to be ready by application emulator 154. In one embodiment, application emulator 154 polls DLL 157 periodically. In another embodiment, DLL 157 raises an event which is recognized by application emulator 154 as a user output message. Application emulator receives the user output into output buffer 202. In one embodiment, buffer 202 maintains memory space containing user output for each CVM executing in system 100. Application emulator 154 writes the user output to the portion of buffer 202 corresponding to the thread ID associated with the user output message. Output generator 208 reads the output buffer 202 corresponding to the active application ID 204, and passes this to input/output mapper 210, which then maps the user output to the user interface, enabling the user to perceive the user output. The output can include a display graphic or text, sound, vibration, or other.

Figure 5:
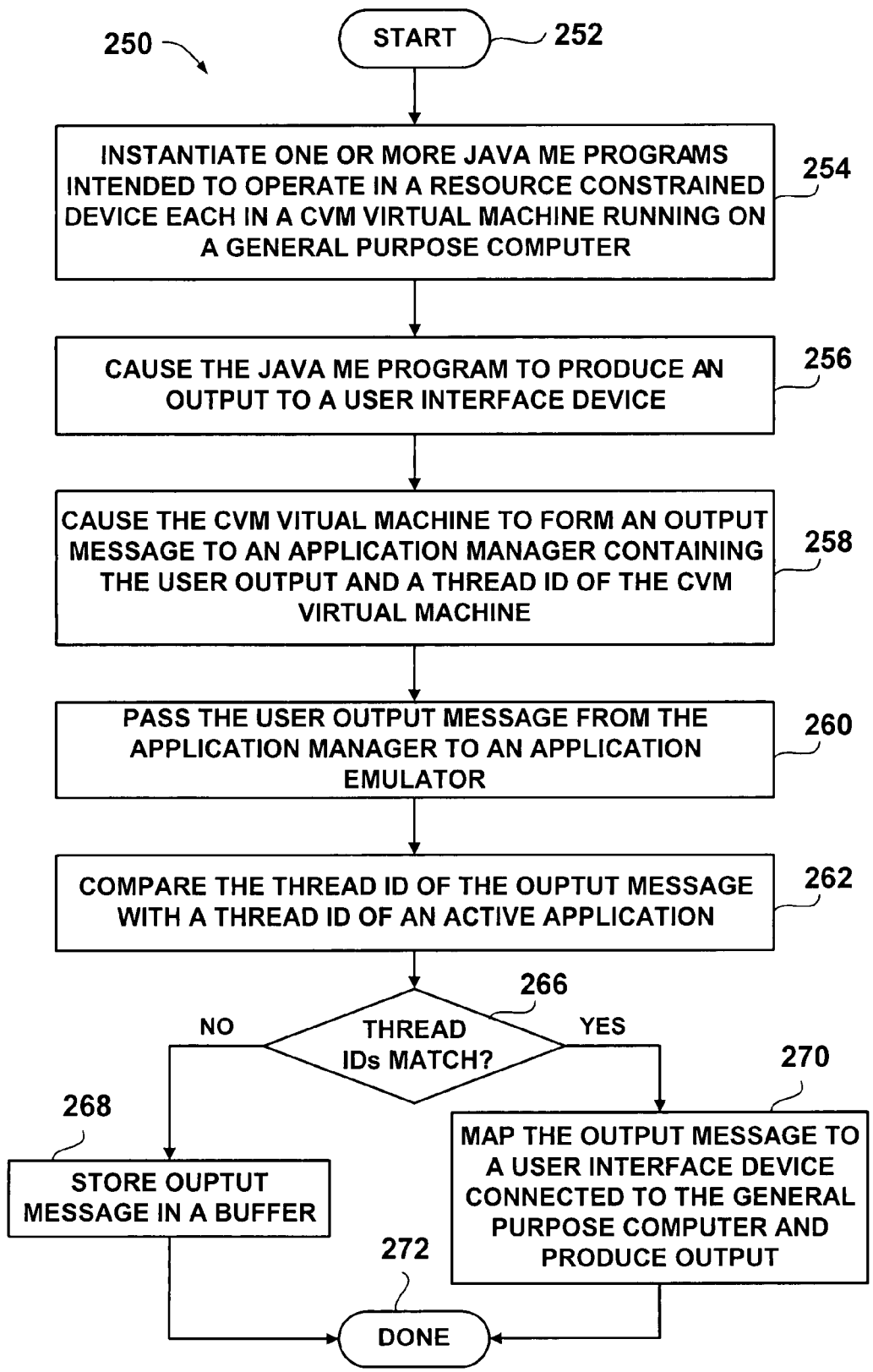
FIG. 5 shows a flowchart depicting by way of example a procedure for providing user output from a cross platform program in the general purpose computer system of FIGS. 1-3.

FIG. 5 shows a flowchart 250 depicting by way of example a procedure for providing user output. This procedure includes operations for communicating between one of a plurality of native language applications and a cross platform application such as a Java SE application. The procedure begins as indicated by start block 252, and proceeds to operation 254, wherein one or more cross platform programs, such as Java ME applications, that are intended to operate in a resource constrained device are instantiated each in a corresponding CVM virtual machine running on a general purpose computer. The instantiation may include directing or causing an application management program, which may itself be a cross-platform application, to launch the one or more cross-platform applications. The application management program may be initiated by the operating system in accordance with, e.g., a command from an application emulator, a script, or other well-known means.

After the cross-platform applications are instantiated, the procedure flows to operation 256, wherein the cross-platform program is caused to produce an output to a user interface device. In one embodiment the cross-platform application is a Java ME application designed to produce user output, e.g., a graphic, to a display component of a resource constrained device such as a cell phone or low-power electronic device. The output is caused by its programming. Therefore, in one embodiment, the Java ME application is programmed to generate a graphic for display to a user. More specifically, the cross-platform program calls an API of the virtual machine and passes information defining the output, e.g., the graphic, to the virtual machine, which is responsible then for causing the output to be presented to the user.

The procedure then flows operation 258, wherein the virtual machine is caused to form an output message containing the information defining the user output and a thread ID of the virtual machine. The virtual machine then passes the message to an application manager which manages the lifecycle of the cross-platform program. In one embodiment, the virtual machine is a CVM. The message may be passed to the application manager using a common resource, such as a shared block of memory. The application manager may be a cross platform program, in which case it receives the message by way of APIs incorporated into its respective virtual machine, identifies the message as user output, and, in operation 260, passes the message to an application emulator, also by way of the common resource. In one embodiment, the application emulator is a cross platform program such as a Java SE application, which executes within a JVM. In this instance, the application emulator may utilize JNI and an external DLL or shared library file to interact with the shared resource and retrieve the user output message.

Once the application emulator receives the message, it compares the thread ID attached to the message in operation 258 with an active application ID in operation 262. If the thread ID and active application ID do not match, then the procedure flows to operation 268 as indicated by decision block 266. In operation 268, the user output message is stored in an output message buffer corresponding to the thread ID, and the procedure ends as indicated by done block 272. However, if the thread ID and the active application ID match at decision block 266, then the procedure flows to operation 270, wherein the information defining the user output is mapped to a user interface device connected to the general purpose computer, and the user output is presented to the user by way of the user interface device. The procedure then ends as indicated by done block 272. Exemplary user outputs include a graphic or text, a sound, or a vibration. Other user outputs known in the field of resource constrained devices may also be implemented.

Figure 6:
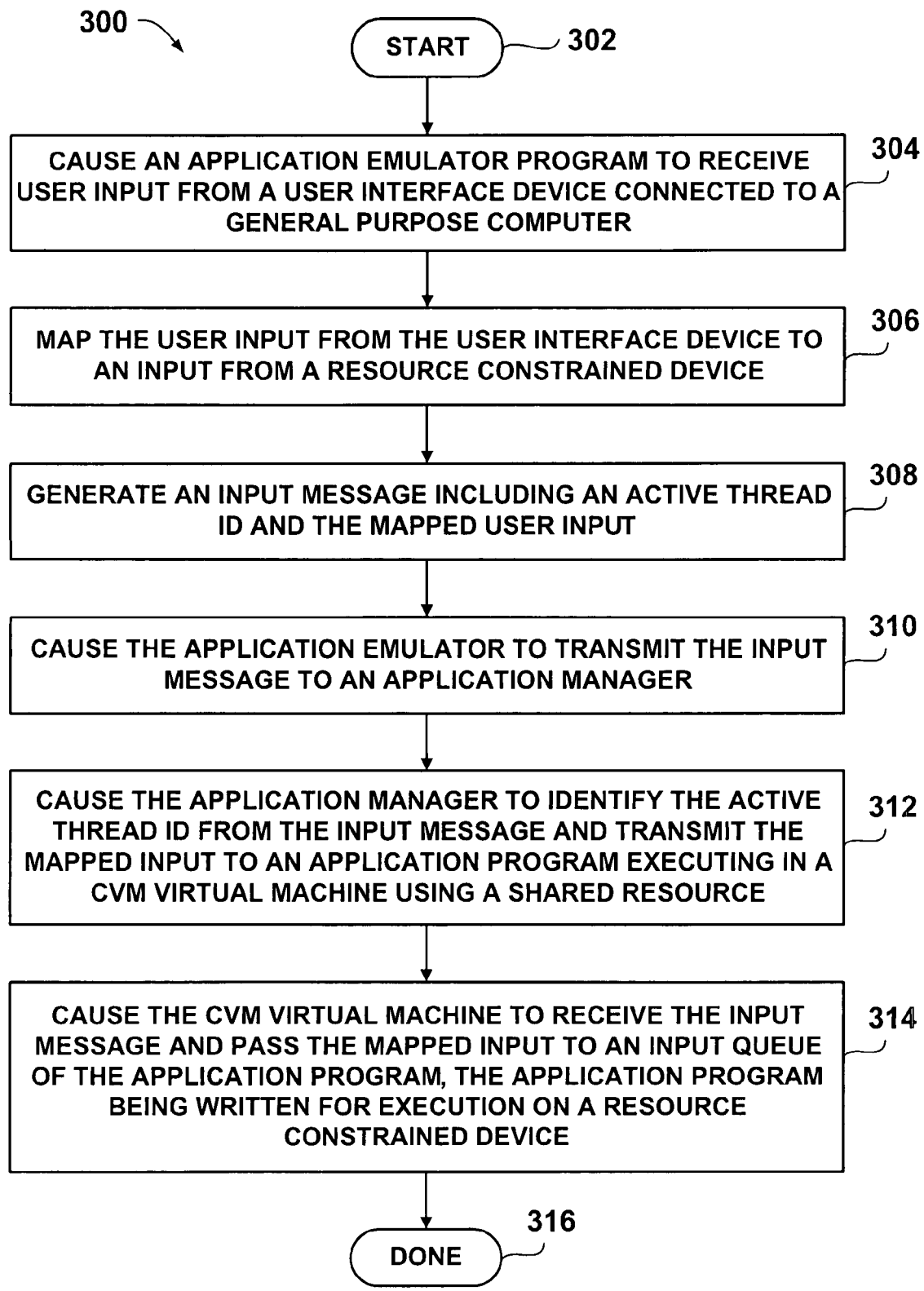
FIG. 6 shows flowchart depicting by way of example a procedure for obtaining user input in a cross-platform program designed for execution on a resource constrained platform that is being emulated on the general purpose computer system of FIGS. 1-3.

FIG. 6 shows flowchart 300 depicting by way of example a procedure for obtaining user input in a cross-platform program designed for execution on a resource constrained platform that is being emulated on a general purpose computer. The procedure begins as indicated by start block 302 and flows to operation 304, wherein an application emulator receives a user input from a user interface device connected to the general purpose computer. In one embodiment, the application emulator is a cross-platform application that executes in a virtual machine.

In operation 306, user input is received and recognized as either being directed towards a virtual interaction with the emulated application or not. When the user input is directed towards a virtual interaction, the user input is mapped to a corresponding input from the resource constrained platform being emulated. For example, if the user types an "arrow" button on the general purpose computer keyboard, the key code received by the application emulator is mapped to a corresponding code that would be generated by the resource constrained application when the user presses a corresponding arrow button. Likewise, the virtual interaction could include a mouse selection of a user interface element represented in graphical representation 113 (FIG. 3), wherein the mapped user input defines the user interface element.

In operation 308, a user input message is generated containing the active application ID and information that defines the mapped user input. The active application ID is selectable by the user to select which of a plurality of concurrently running applications is active. The active application is the one that controls the user interface (or a portion thereof) and receives user input.

In operation 310, the application emulator is caused to transmit the user input message to the application manager. As described above, the application manager may call a method via a JNI link to a shared library file or DLL. The shared library or DLL will then write the message to a shared memory space, which may then be read by the application manager.

In operation 312, the application manager receives the user input message, identifies the message as containing user input, and passes the user input message to one of a plurality of CVMs via the shared resource, e.g., by writing the information to the shared memory space so that it is available to be read by the CVM. The target CVM is identified by the active application ID attached to the user input message. In one embodiment, the user input message is passed to a common area of a shared block of memory, and the target CVM application identifies the message as belonging to it, reads the message, and removes the data or resets shared pointers to the data. In another embodiment, the user input message is written by the application manager to a portion of the shared memory assigned to the target CVM.

In operation 314, the CVM is caused to receive the user input message from the application manager, e.g., by reading the message from the shared memory space, and passing the information defining the user information, which was mapped from the actual user input in operation 306, to an input queue of a Java ME application executing in the CVM. The procedure then ends as indicated by done block 316.

Those skilled in the art will recognize that, while the procedures outlined in FIGS. 5 and 6 are directed to an application emulator written in Java executing in a JVM and plural cross platform applications written in Java ME and executing in a CVM, other programming environments can be used. Furthermore, the communication technique of attaching a active application ID to a user input message or a process ID to a user output message may be useful in contexts other than emulation of cross-platform software and devices therefore.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated. Further, the manipulations performed are often referred to in terms such as producing, identifying, determining, or comparing.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion. In addition, the invention may be encoded in an electromagnetic carrier wave in which the computer code is embodied.

Embodiments of the present invention can be processed on a single computer, or using multiple computers or computer components which are interconnected. A computer, as used herein, shall include a standalone computer system having its own processor(s), its own memory, and its own storage, or a distributed computing system, which provides computer resources to a networked terminal. In some distributed computing systems, users of a computer system may actually be accessing component parts that are shared among a number of users. The users can therefore access a virtual computer over a network, which will appear to the user as a single computer customized and dedicated for a single user.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for emulating a resource constrained platform on a general purpose computer, the method comprising:
    causing an application emulator to generate and display a graphical representation of a user interface of the resource constrained platform, the application emulator being a program executing on the general purpose computer;
    receiving in the application emulator user input generated by user interaction with a user interface of the general purpose computer, the user interaction indicating a virtual interaction with the resource constrained device;
    mapping the user input to a mapped user input, the mapped user input comprising a representation of the virtual interaction with the resource constrained device;
    generating a user input message having an active application identifier and information defining the mapped user input, the active application identifier identifying a selected one of a plurality of cross platform applications, each of the cross platform applications being suitable for execution on the resource constrained platform;
    passing the user input message to one of a plurality of virtual machines, the one of the plurality of virtual machines having a thread identifier corresponding to the active application identifier and running the selected one of the plurality of cross platform applications, the passing comprising accessing a shared resource of the general purpose computer system; and
    receiving the information defining the mapped user input into the selected one of the plurality of cross platform applications, the selected one of the plurality of cross platform application receiving and interpreting the information as actual user input of the resource constrained device.

2. The method of claim 1, wherein the virtual interaction includes a pressing a key of a keyboard, the key being mapped to a button associated with the resource constrained platform.

3. The method of claim 1, wherein the virtual interaction includes a mouse selection of a user interface element represented in the graphical representation, the mapped user input defining the user interface element.

4. The method of claim 1, wherein the application emulator is a cross platform application executing in an additional virtual machine and the passing of the message comprises invoking a method made available by a DLL running in a same process as the application emulator, the accessing of the shared resource comprising causing the DLL to write the user input message to a block of memory shared by the application emulator and the one of the plurality of virtual machines.

5. The method of claim 1, wherein the passing of the user input message to one of the plurality of virtual machines comprises:
    initially passing the user input message to an application manager, the application manager being a program responsible for managing a lifecycle of each of the cross platform applications;
    causing the application manager to identify the user input message as containing user input for one of the plurality of cross platform applications; and
    forwarding the user input message to the one of the plurality of virtual machines based on the active application identifier included in the user input message.

6. A method for emulating a resource constrained platform on a general purpose computer, the method comprising:
    causing one of a plurality of cross platform applications to generate an output suitable for a user output device attached to the resource constrained platform, the user output being passed to an application programming interface of a virtual machine within which the cross platform application executes;
    causing the virtual machine to generate a user output message, the user output message having information defining the user output and a thread identifier that uniquely identifies a process thread of the general purpose computer that is responsible for executing the virtual machine;
    causing the virtual machine to pass the user output message to an application emulator, the passing comprising accessing a shared resource of the general purpose computer system, the application emulator executing in a different process than the virtual machine, the application emulator having a user selectable active application identifier;
    causing the application emulator to compare the active application identifier to the thread identifier;
    causing the application emulator to map the user output defined by the information defining the user output in the user output message to a user output device connected to the general purpose computer system when the active application identifier corresponds to the thread identifier; and
    causing the application emulator to store the user output defined by the information defining the user output in an output buffer when the active application identifier does not correspond to the thread identifier.

7. The method of claim 6, wherein the user output includes a graphic for display on a display device.

8. The method of claim 6, wherein the user output includes a sound for playback through an audio device.

9. The method of claim 6, wherein the application emulator is a cross platform application executing in an additional virtual machine and the passing of the message comprises responding to an event raised by a DLL running in a same process as the application emulator, the accessing of the shared resource comprising causing the DLL to read the user output message from a block of memory shared by the application emulator and the one of the virtual machine.

10. The method of claim 6, wherein the passing of the user output message to the application manager comprises:
    initially passing the user output message to an application manager, the application manager being a program responsible for managing a lifecycle of each of the cross platform applications;
    causing the application manager to identify the user output message as containing information defining user output from one of the plurality of cross platform applications; and
    forwarding the user output message to the application manager.

* * * * *